US008491374B2

(12) United States Patent
Bennett

(10) Patent No.: US 8,491,374 B2
(45) Date of Patent: Jul. 23, 2013

(54) GAMING APPARATUS WITH A WHEEL GAME

(75) Inventor: Nicholas Luke Bennett, Manly Vale (AU)

(73) Assignee: Aristocrat Technologies Australia Pty Limited (AU)

(*) Notice: Subject to any disclaimer, the term of this patent is extended or adjusted under 35 U.S.C. 154(b) by 934 days.

(21) Appl. No.: 12/171,427

(22) Filed: Jul. 11, 2008

(65) Prior Publication Data

US 2009/0227314 A1 Sep. 10, 2009

Related U.S. Application Data

(63) Continuation-in-part of application No. 11/575,325, filed as application No. PCT/AU2005/001373 on Sep. 9, 2005.

(30) Foreign Application Priority Data

Sep. 17, 2004 (AU) ................................ 2004905386

(51) Int. Cl.
*A63F 13/00* (2006.01)

(52) U.S. Cl.
USPC .................. 463/20; 463/16; 463/17; 463/18; 463/19; 463/22

(58) Field of Classification Search
USPC ...................................................... 463/16–22
See application file for complete search history.

(56) References Cited

U.S. PATENT DOCUMENTS

| | | | | |
|---|---|---|---|---|
| 2003/0027628 | A1* | 2/2003 | Luciano | 463/20 |
| 2003/0050110 | A1 | 3/2003 | Wichinsky | |
| 2003/0195034 | A1 | 10/2003 | Dunaevsky | |
| 2004/0053673 | A1 | 3/2004 | Mishra | |
| 2005/0026673 | A1* | 2/2005 | Paulsen et al. | 463/16 |
| 2005/0054412 | A1* | 3/2005 | Gauselmann | 463/16 |
| 2005/0070353 | A1 | 3/2005 | Webb et al. | |
| 2008/0004098 | A1 | 1/2008 | Bennett | |

FOREIGN PATENT DOCUMENTS

| | | |
|---|---|---|
| WO | 0017830 | 3/2000 |

* cited by examiner

*Primary Examiner* — Ronald Laneau
*Assistant Examiner* — Justin Myhr
(74) *Attorney, Agent, or Firm* — McAndrews, Held & Malloy, Ltd.

(57) ABSTRACT

A gaming apparatus and a game controller for a gaming apparatus is provided. A game provided on the gaming apparatus under the control of the game controller is arranged to play a first game in the form of a wheel game having a number of outcome indicating parts. It is also arranged to play a further game, in the form of a symbol game, a function of which is based on an outcome of the wheel game. In one embodiment, a function of one or more symbols in the symbol game is determined by an outcome of the wheel game.

23 Claims, 11 Drawing Sheets

GAMING APPARATUS WITH A WHEEL GAME

RELATED APPLICATIONS

This application claims priority to, and is a continuation-in-part of, U.S. patent application Ser. No. 11/575,325 which is the National Stage (filed on Sep. 12, 2007) of International Application No. PCT/AU05/01373 have an International filing date of Sep. 9, 2005, which claims priority to Australian Patent Application No. 2004905386 filed Sep. 17, 2004, all of which are incorporated herein by reference in their entirety.

FEDERALLY SPONSORED RESEARCH OR DEVELOPMENT

[Not Applicable]

MICROFICHE/COPYRIGHT REFERENCE

[Not Applicable]

TECHNICAL FIELD

The present invention relates to a gaming apparatus, a game controller for a gaming apparatus and/or a method of providing a game of chance, all including a game generally of the type of a wheel game. In particular, but not exclusively, the present invention relates to a gaming apparatus, game controller for a gaming apparatus and/or a method of providing a game of chance that includes a wheel game as a feature game.

BACKGROUND

Many gaming machines in existence at present include both a primary game, which may be a spinning reel game, and a secondary game that is a feature game. Typically the feature game is able to be played only occasionally and often provides the opportunity for winning a substantial prize. Gaming machines having a feature game have experienced widespread success in attracting and retaining players.

Games incorporating a spinning wheel or representation of a spinning wheel are often very effective at providing an enjoyable gaming experience for a player. This may be due to the simplicity of a spinning wheel combined with its visual impact.

Known wheel features are a game of chance in which a player may participate which is in addition to a primary fame of a gaming machine. The game of chance involves the display of a number of segments that together form a circular shape, and a selector to select one or more of the areas so as to indicate an outcome of the same of chance. Feature games of this type will be referred to herein as "wheel features".

U.S. Pat. Nos. 5,823,874 and 5,848,932 both to Adams describe a secondary payout indicator in the form of a rotatable bonus wheel which can be caused to spin automatically or in response to some action by a player, when the primary game indicates one of a predetermined plurality of indicia.

A major disadvantage of wheel features is the limitation on the size of the prize segments caused by the limited area that a representation of a wheel can occupy. There are therefore, a limited number of prizes that can be displayed effectively on the wheel without taking away from the look and feel of the wheel, and therefore taking away one of the advantages of a wheel feature, by making it cluttered and/or by malting it difficult to read the prize values.

Australian patent number 711501 describes providing an electronic wheel where the odds of landing on any given indicium are determined by the number of integers in the first range of integers mapped to the indica, where the number of integers in the first range may be different from the number of indicia on the simulated wheel. This patent also describes changing, replacing or otherwise modifying indicia on a simulated wheel so that, even though it may be desired to provide only n indicium locations on the simulated wheel, the simulated wheel may be provided with m possible indicia by "swapping" new indicia onto the wheel during simulated spinning. The patent further describes having a wheel that provides the potential for winning a large or jackpot prize, but which can only provide such a win if the player has previously achieved a predefined result on a previous spin of another wheel, with the previous wheel not needing to provide an opportunity for a jackpot win.

U.S. Pat. No. 6,612,575 describes a gaming machine having a game with a bonus feature where a player places a wager, spins a plurality of first reels having indicia thereon, determining if indicia displayed by the plurality of first reels associated with a first pay line comprises a predetermined winning combination, and if so, paying a first award and the associating that first award with at least one bonus reel, permitting a player to spin the at least one bonus reel or otherwise participate in the bonus event, and determining if an award associated with the at least one bonus reel is associated with a second pay line, and if so, paying a bonus award.

Regulations for some markets, including most Australian markets, requires that the odds for wheels (and other typical casino devices) when used in a gaming machine must reflect the expected odds of that device. Weightings similar to those sometimes used on reel strips of spinning reel gaming machine games, for example using a spinning reel game of the type described in the U.S. Pat. No. 4,448,419 (Telnaes) are not allowed to be applied to wheels. This makes it more difficult to offer large prizes on a wheel without reducing or eliminating the advantages of a wheel feature, because the larger the prize, the more effect it will have on the overall return to the player of the game. Accordingly, to support a large prize, either the chances of the player activating the wheel feature have to be very low or the amount of the average wager of the player needs to be high.

The methods described in the Australian patent number 711501 are said to address the desire of providing a wheel feature that permits relatively small wagers but provides a potential for relatively large prizes. Some of the methods may not comply with the regulations for some markets. In addition, a disadvantage of having a wheel that provides the potential for winning a large or jackpot prize, which can only provide such a win if the player has previously achieved a predefined result on a previous spin of another wheel, is that the large prize can not be displayed directly on the wheel. The player may therefore not have the feeling that he or she can win the large prize with just one spin of the wheel.

Any reference in this specification to the prior art does not constitute, not should it be considered, an admission that such prior art was widely known or forms part of the common general knowledge in Australia, or in any other jurisdiction, before the priority fate of any of the appended claims.

Throughout this specification the term "comprise" and variations on this term including "comprising" and "comprises" are to be understood to imply the inclusion of a feature, integer, step or element, and not to exclude other features, integers, steps or elements.

SUMMARY OF THE INVENTION

In accordance with the first aspect, the present invention provides a gaming apparatus, comprising a game controller arranged to control operation of a game and a further game, and at least one display, the game controller being arranged to control the display to display representations of play of the game, the representations comprising a selector having a plurality of outcome indicating parts and a marker, the game controller being arranged to determine a game outcome for the game and control the marker to indicate the outcome indicating part associated with the game outcome, and the game controller being arranged to control operation of the further game in dependence on the outcome of the game.

In an embodiment, the game controller is arranged to select a plurality of symbols from a set of symbols for play of the further game, and to control the display to display a plurality of the selected symbols. In an embodiment, an outcome of the game determines a function of one or more of the symbols in the further game. In an embodiment, the outcome of the game determines that one or more of the symbols in the further game is "wild". In an embodiment, outcomes of the further game are based on symbols appearing in one or more horizontal lines, diagonal lines or any other predetermined way. Determining the function of a symbol by an outcome of the game therefore may determine an outcome of the further game. In an embodiment, the further game is a reel-type game, and the game controller is arranged to control the display to display the plurality of the selected symbols in one or both of rows and columns. In an embodiment, the one or both of rows and columns of symbol positions is represented as a reel bearing the symbols, or is a reel bearing the symbols.

In an embodiment, the game controller is arranged to play a plurality of further games and to play the game before each occurrence of the plurality of further games. In an embodiment, the game outcome may determine a number of further games to be played.

In an embodiment, the outcome indicating parts together present an annular or circular shape to the player, and wherein the at least one marker one of moves and appears to move about the outcome indicating parts and then stops to show the representation of a selection of at least one outcome indicating part.

In an embodiment, the selector comprises a plurality of illuminable areas located in a path extending about the outcome indicating parts, each of the illuminable areas being illuminated and darkened in a sequential pattern and wherein an illuminable area represents said at least one marker only when it is illuminated.

In an embodiment, the outcome indicating parts are each displayed as a stationary area and the at least one marker is displayed as one of moving and appearing to move relative to the outcome indicating parts.

In an embodiment, the outcome indicating parts are each displayed as a stationary area and the at least one marker is displayed as one of moving and appearing to move relative to the outcome indicating parts progressively along a path that extends past every one of the plurality of outcome indicating parts.

In an embodiment, each outcome indicating part includes indicia on it that indicates an award to a player.

In an embodiment, the game is a wheel game.

An advantage of at least an embodiment of the invention, is that a relatively large prize may be awarded, as the prize may depend on play of the game and then a successive further game. Where the game is a wheel game, for example, which would usually award a low prize (determined by the relatively high chance of selecting a particular segment on a wheel), because the prize may also depend on the outcome of the further game, then higher odds can be offered for winning the prize in the further game and a higher prize can be awarded.

In an embodiment, the game and further game may be generated as a feature game, in response to the outcome of a primary game. The primary game may, for example, be a reel game, where the game controller is arranged to randomly select and display several symbols from a predetermined set of symbols and to determine a game outcome such as a game win based on the selected symbols. In this embodiment, one game outcome is a win of a feature game, which results in the game and further game being played.

In accordance with a second aspect, the present invention provides a method of gaming, comprising the steps of playing a game and a further game, displaying representations of the game, the representations comprising a selector having a plurality of outcome indicating parts and a marker, determining a game outcome for the game and controlling the marker to indicate the outcome indicating part associated with the game outcome, playing the further game, and operating the further game in dependence on the outcome of the game.

In accordance with a third aspect, the present invention provides a game controller and associated computer memory for a gaming machine, the game controller operable to control play of a game that is played on a gaming machine and to generate control signals for at least one display, wherein when the control signals are received by a display, the display displays images of the game, the game controller being arranged to control the display to display representations of play of a game, the representations comprising a selector having a plurality of outcome indicating parts and a marker, the game controller being arranged to determine an outcome for the game and control the marker to indicate the outcome indicating part associated with the game outcome, the game controller being arranged to control operation of a further game in dependence on the outcome of the game.

In accordance with a fourth aspect, the present invention provides a computer programme, comprising instructions for controlling a computer to implement a gaming apparatus in accordance with the first aspect of the invention.

In accordance with a fifth aspect, the present invention provides a computer readable medium providing a computer programme in accordance with the third aspect of the invention.

In accordance with a sixth aspect, the present invention provides a data signal comprising a computer programme in accordance with the third aspect of the invention.

Further aspects of the present invention will become apparent from the following description, given by way of example of preferred embodiments only and with reference to the accompanying drawings.

DESCRIPTION OF PREFERRED EMBODIMENTS

Figure 1:
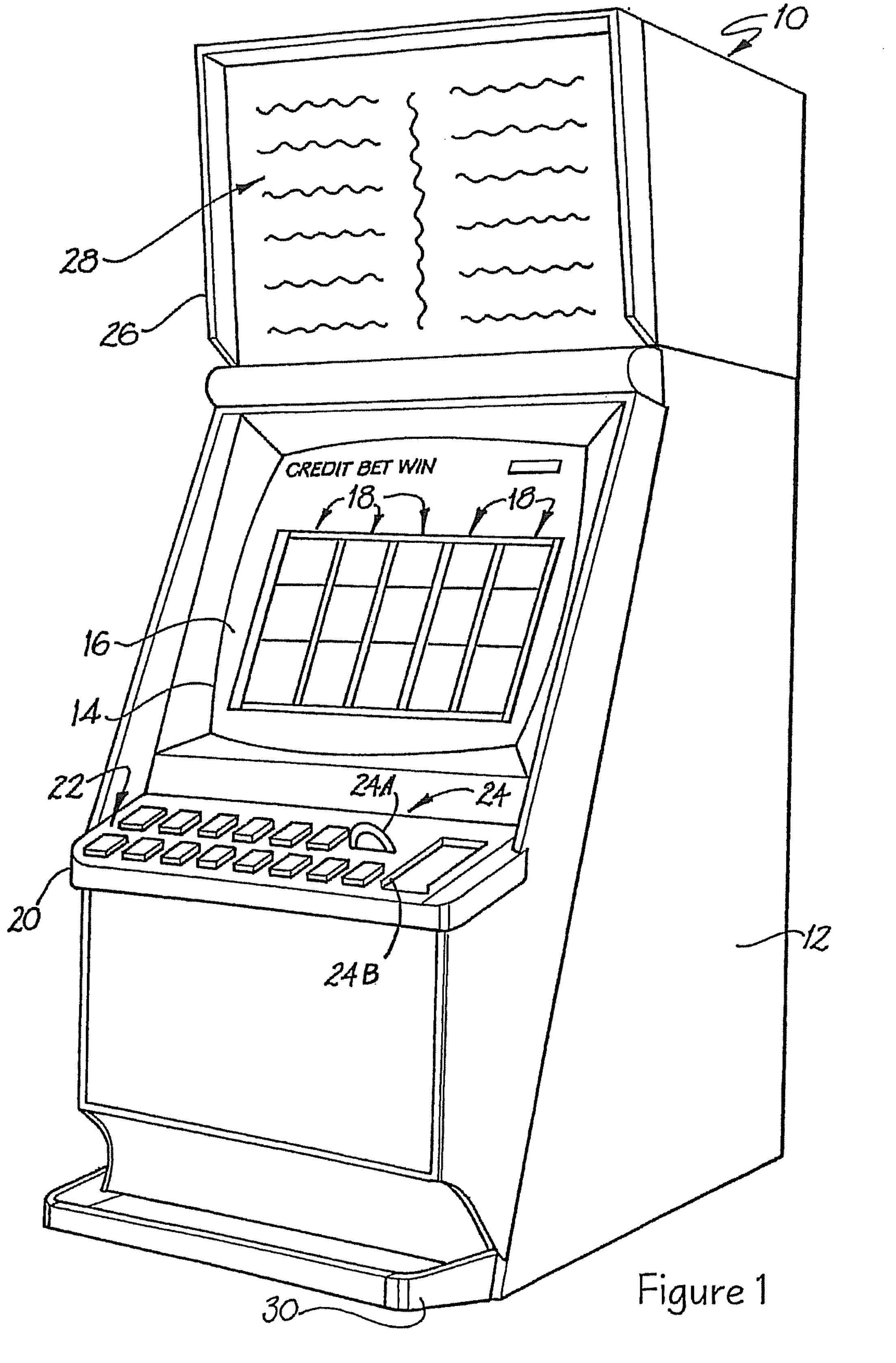
FIG. 1 shows a perspective view of an example gaming machine in which the present invention may be implemented.

Referring to FIG. 1 of the accompanying drawings, a gaming machine generally referenced by arrow 10 is shown. The gaming machine 10 is an example of a gaming machine that is suitable to implement the present invention. The architecture of the gaming machine 10 includes a console 12 of having a display 14 on which is displayed representations of a game 16 that can be played by a player. A mid-trim 20 of the gaming machine 10 houses a bank of buttons 22 for enabling a player to play the game 16. The mid-trim 20 also houses a credit input mechanism 24 including a coin input chute 24A and a bill collector 24B. A top box 26 may carry artwork 28, including for example, pay tables and details of bonus awards and other information or images relating to the game. A coin tray 30 is mounted beneath the console 12 for cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable Video Display Unit, or the visible portion of an electromechanical device. The top box 26 may also be a display, for example a video display unit, which may be the same type as the display 14, or a different type of display.

Figure 2:
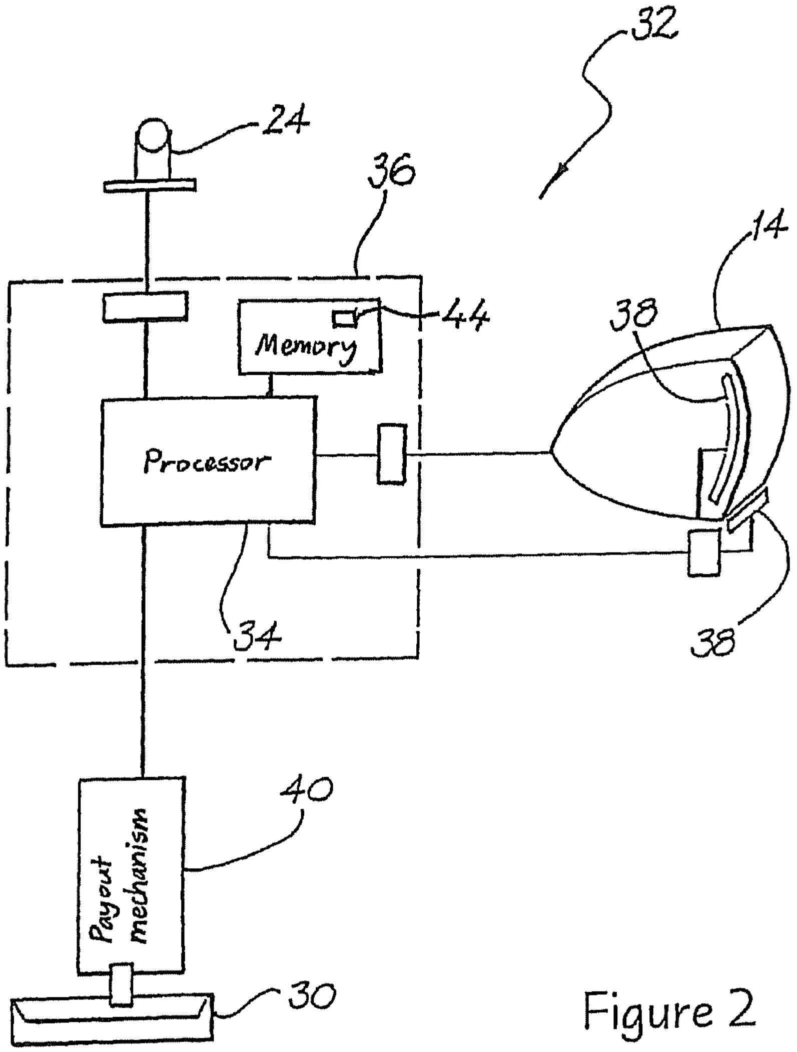
FIG. 2 shows a block diagram of a control circuit of the gaming machine shown in FIG. 1.

Referring now to FIG. 2 of the accompanying drawings, a simplified block diagram of a control circuit 32 for the gaming machine 10 is shown. The control circuit 32 includes a controller 26 having a processor 24, which is most suitably a computer processor, and associated computer readable memory 42. A program 44 stored in memory 42 contains instructions, that when executed by the processor 24 causes the controller 26 to implement the wheel feature of the present invention, optionally also the game 16 (which may be provided through a different program and which may be controlled by a separate controller), and drive the display 14. A set of sensors 38A are provided with the bank of buttons 22 to allow the controller 36 to determine when a player depresses one of the buttons in the bank of buttons 22. One or more further sensor 38B may be provided with the display 14, if the display 14 includes touch pads. Those skilled in the relevant arts will appreciate that controller 36 may represent either a single device or a plurality of devices, which may be local or remote to each other. The processor 34 may be any suitable processor, microcontroller, programmable logic device or other suitable device for controlling a gaming machine. In addition, the memory 42 may be local or remote and may formed by multiple memory parts.

The controller 36 also receives input signals from the credit input mechanism 24 to enable it to determine whether or not a player has provided sufficient credit to commence play of the game 16 and to enable a running total of a players credit to be maintained. The controller 36 also drives a payout mechanism 40, which for example, may be a coin hopper for feeding coins to the coin tray 30 to make a pay out to a player when the player wishes to redeem his or her credit.

Those skilled in the relevant arts will appreciate that the gaming machine 10 may include many other components to perform functions such as additional computations, communications and monitoring of play. FIG. 2 and the associated description herein is provided only to give a background to the environment in which the present invention may be implemented.

Those skilled in the relevant arts will also appreciate that the architecture of the gaming machine 10 is only one example of a large number of possible alternative gaming apparatus architectures that may be used with the present invention. By way of example only, a gaming apparatus may have an architecture of one or more displays, a user interface, a game controller and a transaction handling unit for accepting and paying credits or currency in some form, all located together in a single housing or in a plurality of physically connecting housings. This is the architecture of the gaming machine 10. A second example architecture of a gaming apparatus is to have a display and a user interface located at a separate location from a game controller, wherein the game controller communicates with the display and the user interface through a fixed wire or wireless communication channel. A third example architecture is to have a first and a second display and optionally shared by a plurality of gaming machines. The second display may be controlled by a separate controller from a controller for the first display, the two controllers being in communication with each other.

In other variations of the architecture of the gaming apparatus that may be used with the present invention, the display 14 may be replaced by a mechanical display where a wheel feature according to the present invention is displayed to a player using a separate display. The bank of buttons 22 may be omitted and reliance placed entirely on touch pads provided on the display 14, or vice versa. The credit input mechanism 24 may be a ticket reader, card reader, smart card reader, a communication interface with a personal mobile device, or any other type of validation device, either in addition to or instead of one or both of the coin input chute 24A and the bill collector 24B. Alternatively, where appropriate for the intended use of the gaming machine, a credit input mechanism may be omitted entirely. Similarly the pay out mechanism 40 may be a ticked printer, card writer or other suitable device, or may be omitted entirely, with credits, for example, being communicated to a central database (not shown). As previously stated, the top box 26 may include a display, but it may also be omitted and if a second display is required it may be located separated from the console 12. A gaming machine, irrespective of its architecture is apparatus that allows a player to participate in a game of chance, irrespective of whether or not the apparatus requires the player to wager a stake in order to participate in the primary game.

Figure 3:
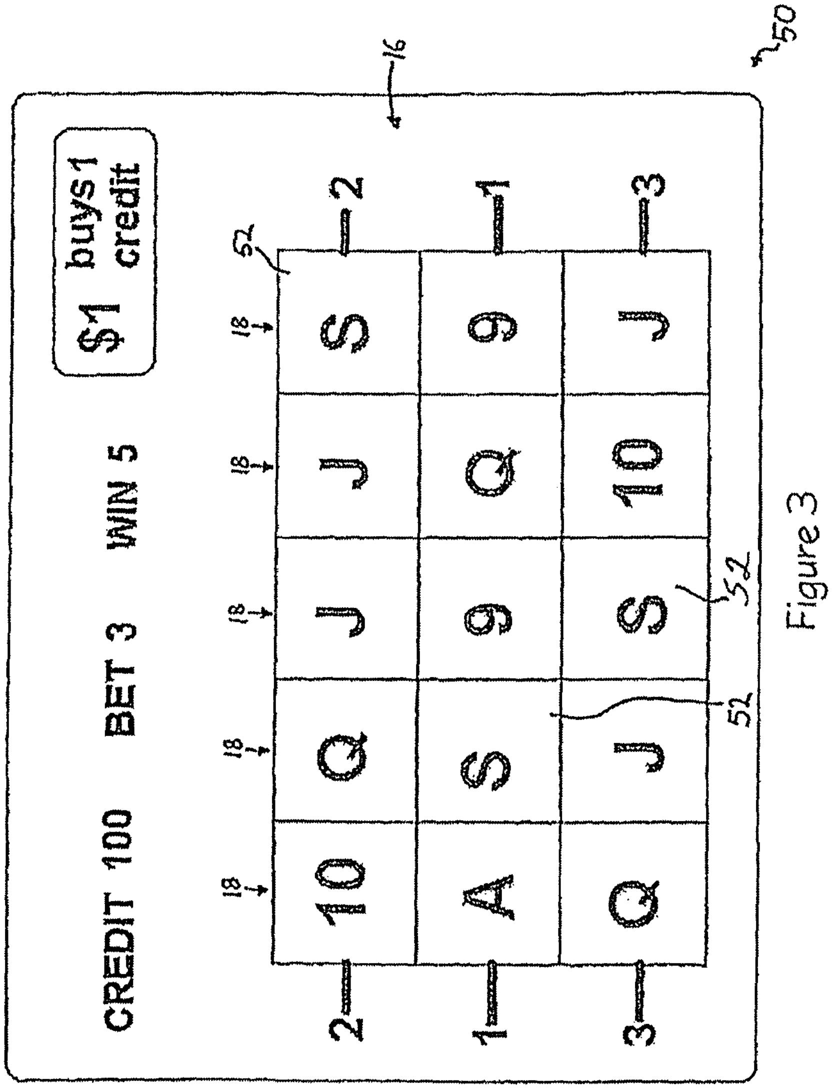
FIG. 3 shows a screen display of an example of a primary game that may give rise to a wheel feature.

FIG. 3 shows a screen display 50 of an example of a game 16 that may be played on the gaming machine 10. The game 16 is a primary game and may be one of several such games that may be played using the gaming machine 10. A primary game, as the term is used herein, means a game of chance, optionally with a skill component or perceived skill component, that is playable on a gaming machine. The term "base game" has a corresponding meaning. Typically, although not necessarily, a player can only participate in a wheel feature of the present invention after a trigger event has occurred, the trigger event being related to play of a primary game of a gaming machine. The screen display 50 shows the occurrence of a predetermined trigger condition giving rise to a bonus feature. A bonus feature is a secondary game that can be participated in by the gaming machine 10 (or the player at the gaming machine 10) that is in addition to the primary game. Typically a bonus feature can only be participated in at certain time, which may be dictated by play of the primary game. In this case, the trigger condition is the occurrence of a display of three scatter symbols 52 on reels 18 shown on the screen display 50. Upon the occurrence of the trigger condition, a bonus feature is awarded, in particular a wheel feature.

Those skilled in the relevant arts will appreciate that the trigger event could be any one of a number of trigger events and that multiple trigger events may exist. For example, a trigger event may be based on a measure of time, a particular amount of wagering activity on the gaming machine 10, or on some activity of a group of gaming machines including the gaming machine 10. Also, the trigger event may depend at least in part on player tracking information and may be a random or quasi-random event. The trigger event may be a random determination for each bet that is made on each gaming machine, where the chance of the wheel feature being triggered is dependent upon the size of the bet on the gaming machine 10, it may be a random determination for each game played on each gaming machine 10 such that the chance of triggering the wheel feature is independent of bet size and the same for each game played, it may be a standard symbol based trigger—for example three or more scatter symbols appearing during base game play on one of the gaming machines 10, or it may comprise the appearance of other types of symbol based triggers, such as special feature symbols being overlaid over standard reel symbols or appearing in the background of standard reel symbols, where certain combinations of the special feature symbols trigger the wheel feature. The selection of an event that triggers a wheel feature of the present invention is up to the game designer and many other possibilities exist.

While the preferred form of the invention is a particular form of wheel feature, the wheel feature described herein may also be a standalone game, and may also be a base game for another feature game.

Figure 4:
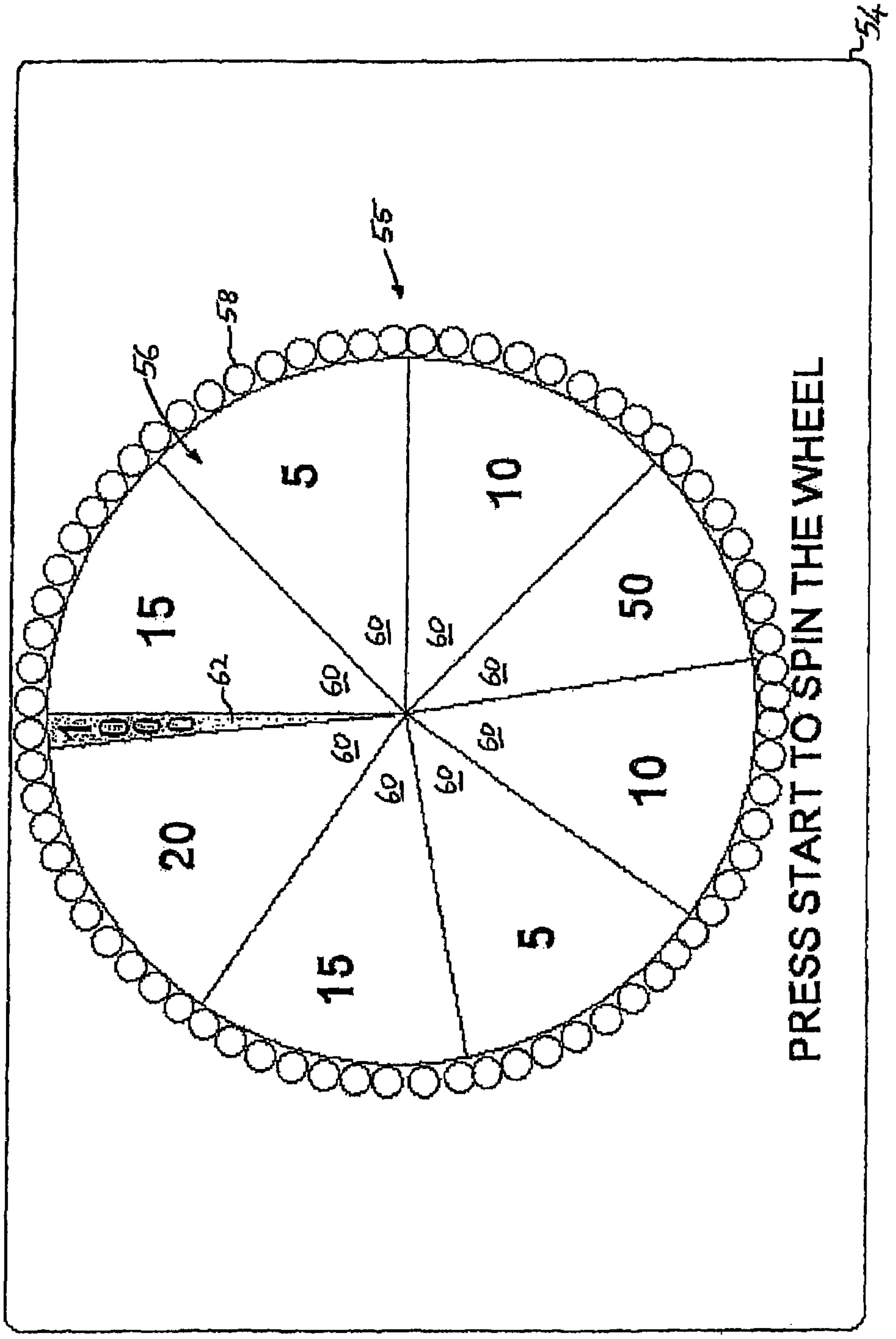
FIGS. 4 and 5 shows a first embodiment of a screen display associate with a wheel feature.
Figure 5:
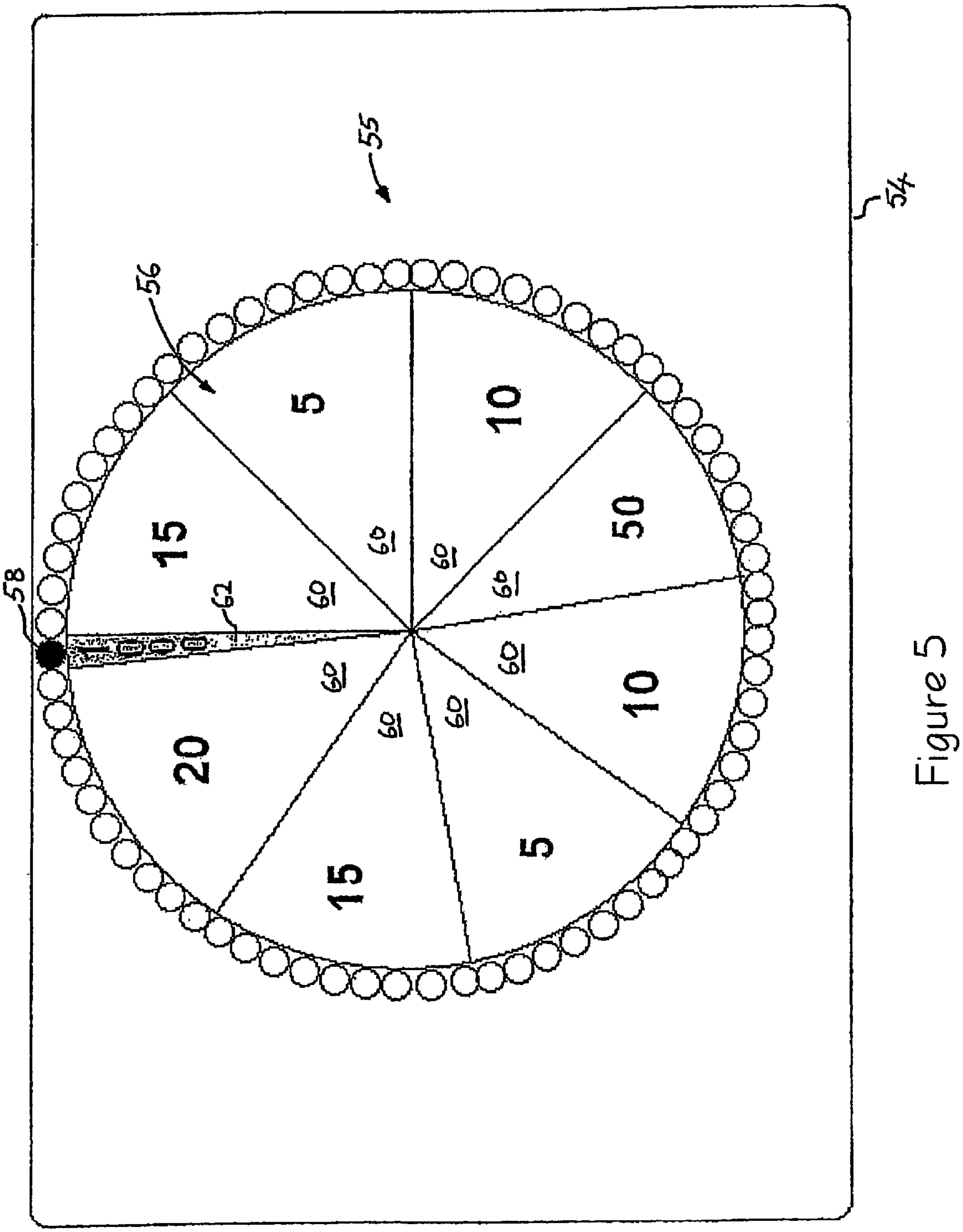

As an example, when the trigger event occurs the screen display 50 is replaced by a screen display 54, shown in FIGS. 4 and 5 of the drawings The user may be requested to select a button "play feature" or similar to initiate the wheel feature. The screen display 54 shows a wheel feature indicator comprising a simulated wheel 56 divided into a number of segments 60, 62 and with a plurality of chaser lights 58 arranged about the periphery of the wheel 56. The plurality of chaser lights 58 operate as part of a selector to select one or more of the segments 60, with a lit chaser light 58 being a marker to show what segment has been selected. Those skilled in the relevant arts will appreciate that the selector may take different forms from a plurality of distinct chaser lights. For example, the selector may be an arrow or similar that travels around the periphery of the wheel 56 in a continuous (or at least in such small steps so as to appear continuous) manner, and stop at a location determined by the controller 36. In another example, the marker may be the highlighting of segments 60 in some manner, for example by changing the colour of the segment 60 or highlighting the periphery of the segment 60 that the marker is currently pointing to. Parts of segments 60 may be also highlighted in this manner where this is required. Equally, the marker may be one or more unlit segments 60. In this way the selection may be made to appear like a process of elimination. Although in the preferred embodiment the marker travels around the segments 60 so as to sequentially and cyclically point to the segments 60, this is not essential and the marker may jump from segment to segment.

The segments 60 are each of approximately the same size, occupying the same visual area and presenting the same area for selection to the markers, plus one segment 62, which is much smaller than the remaining segments 60. The size of each segment 60, 62 is selected during the design of the game to give the desired return to player, according to the expected frequency of their associated outcome, which is often a prize, being awarded. It is to be noted that the outcome indicted by the segment 62 is a prize that is orders of magnitude greater than many of the outcomes or prizes on the segments 60.

The embodiments of the wheel feature indicator 55 shown in the accompanying drawings show a traditional circular wheel, with the individual outcome areas being segments of the wheel. However, alternatives to the circular wheel 56 are possible and may be used to impart a casually distinctive appearance to the wheel feature. For example, an alternative wheel feature indicator may have a generally triangular, rectangular or some other polygon overall shape. The chaser lights 58 also need not travel around the periphery of a contiguous shape and may intersect parts of the wheel feature indicator, for example by travelling along a path defining a figure eight around and between two circles. However, due to its simplicity, proven visual effectiveness and ability to have any sized segment without regard to having to align any intersections of outcome areas with vertices of a shape for visual impact, a single circular shape represents the preferred form of the invention.

In the embodiment shown in FIG. 4, between seven and ten chaser lights 58 are associated with each segment 60, depending on the particular segment. Conversely, the segment 62 only has a single chaser light associated with it. Generally, the larger the number of chaser lights 58 associated with each segment 60, the smaller the prize (if any) that is awarded should the segment be selected and segments that award equal prizes have the same number of chaser lights 58 associated with them. However, neither of these are necessary and can be varied by the game designer to achieve a required effect and playing experience.

When the wheel feature is awarded, the chaser lights 58 are lit in a sequential manner to simulate movement of a marker around the periphery of the wheel 56. If required, the sequential illumination of the chaser lights 58 can be effected in a manner simulating the speeding up of the speed of travel of the lit chaser lights 58 around the periphery of the wheel 56, followed by the chaser lights slowing down and finally stopping. The stopping of the sequential illumination of the chaser lights 58 refers to the sequential illumination of the chaser lights 58 ceasing, with a single chaser light of the chaser lights 58 remaining illuminated. If the chaser light that remains illuminated is that opposite the segment 62, as shown in FIG. 5, a prize of 1000 credits, being the prize indicated by the segment 62, is awarded. Similarly, if the chaser light of the chaser lights 58 that remains illuminated is opposite another segment, then the prize that it is indicated by that segment is awarded. In one possible alternative embodiment a chaser light 58 or other selector may be able to straddle two adjacent segments 60, 62, in which case a double prize could be awarded.

As the 1000 credit prize has only a single chaser light associated with it, in order for the odds of winning the 1000 credit prize to reflect the expected odds of that device on a visual inspection, the chance of one particular chaser light 58 being illuminated is one in seventy two, or more generally (the number of chaser lights 58 associated with a particular prize) in (the total number of chaser lights 58). Therefore, a large prize can be displayed on the wheel 56 while still having an acceptable hit rate for the wheel feature and return to player percentage. If, for example, the wheel feature is triggered on average every 100 games then the feature return would be 29.028% as shown by table 1.

TABLE 1 return calculation for the feature wheel shown in FIG. 4

| Prize for each segment | Probability of occurrence | Average Prize Contribution (%) |
|---|---|---|
| 1000 | 0.013889 | 13.889 |
| 50 | 0.09722 | 4.86 |
| 20 | 0.13889 | 2.778 |
| 15 | 0.1250 | 1.875 |
| 15 | 0.1250 | 1.875 |
| 10 | 0.1250 | 1.250 |
| 10 | 0.1250 | 1.250 |
| 5 | 0.1250 | 0.625 |
| 5 | 0.1250 | 0.625 |
| | 1.000 | 29.028 |

This compares favourably with a wheel where all the segments are the same size but there is no significantly larger prize offered on the wheel. For example, for a wheel feature having eight equally sized segments containing the prize values of 1v150 credits, 1×20 credits, 2×15 credits, 2×10 credits and 2×5 credits and which is also triggered on average once every 100 games, the average return to player percentage would be 28.75%.

It is an advantage of this arrangement that, because the wheel 56 remains stationary, the prizes applicable to the segments 60, 62 are always visible to the player, increasing the sense of anticipation. However, in less preferred embodiments, the wheel 56 may turn and one or more stationary markers may be used, or both the wheel and one or more markers may move.

It will also be appreciated that the top award prize carried by the segment 62 could, instead of being a number of credits, be a progressive prize, non-monetary win such as a number of free games as described below with reference to FIGS. 6 and 8, or another special bonus feature, which may include a car, a holiday or any other prize.

The idea of having a segment much smaller than the others in a wheel game is one way of awarding a prize to a player which is of relatively high value. Another way, in accordance with an embodiment of the present invention, will now be described with reference to FIGS. 6, 10 and 11.

Figure 6:
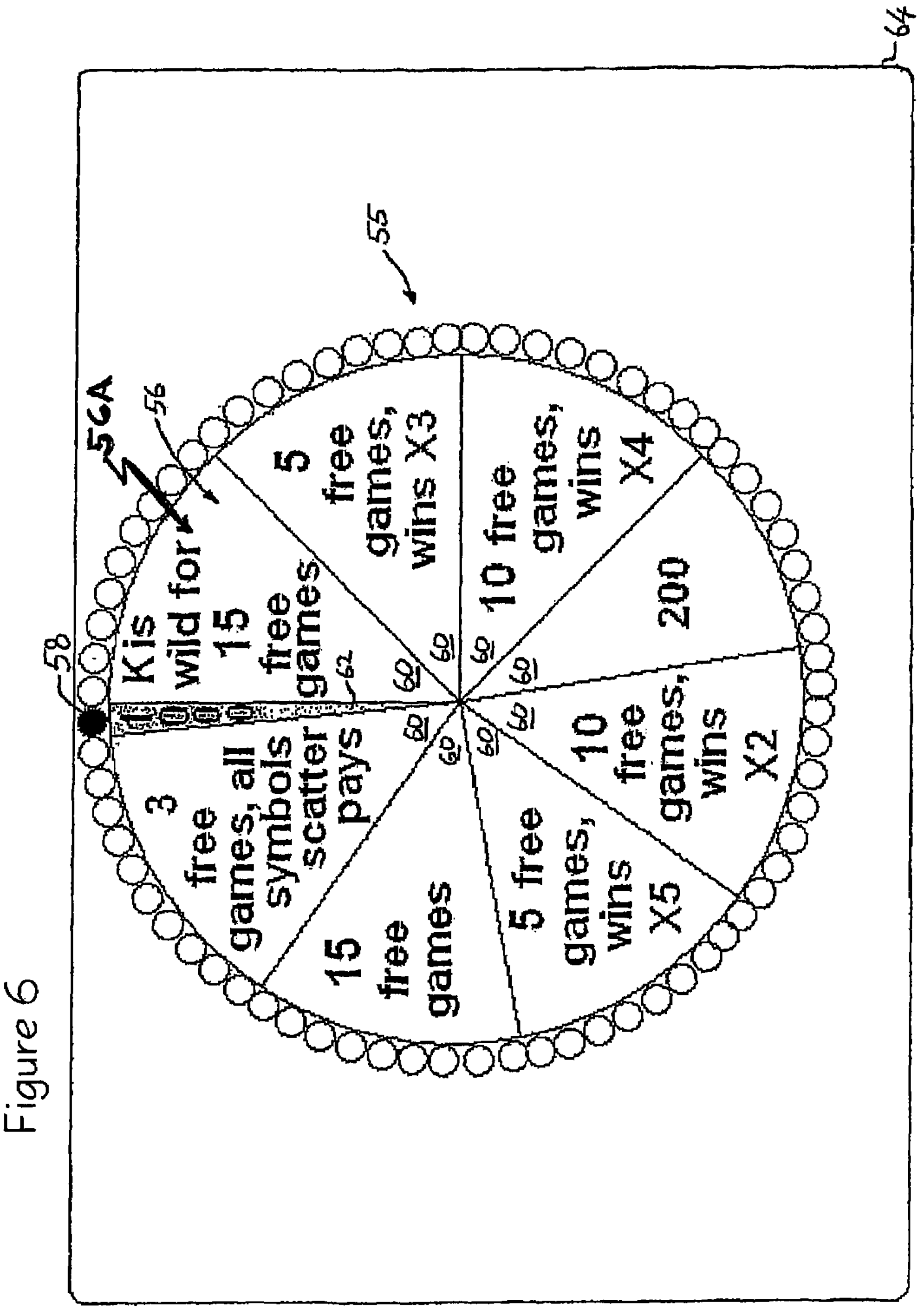
FIG. 6 shows a screen display associated with a wheel feature in accordance with an embodiment of the present invention.

In FIG. 6 of the accompanying drawings, a screen display 64 including an embodiment of the wheel feature indicator 55 is shown. With reference to the previous drawings like reference numerals refer to like parts unless otherwise specified. In this embodiment many of the segments 60 of the wheel 56 carry information relating to outcomes other than a number of credits that can be awarded in the wheel feature. For example, the outcome achieved by play of the wheel feature may be the awarding of a number of free games, where a win in any free game is multiplied by a certain multiplier, or where a particular symbol in the free games acts as a substitute symbol. In this embodiment, a free game may be a further game such as a reel game. The controller is arranged to select a plurality of symbols from a set of symbols and control the display to display the plurality of selected symbols. The display may be similar to the display of FIG. 3, for example. Different types of symbols may be used than in the display of FIG. 3 or the same types of symbols may be utilised. The symbols may be "card symbols", for example, enabling a poker-like game to be represented by the display, or may by any other type of symbol e.g. fruits symbols, cartoon symbols, other graphical symbols or any other symbols. Outcomes of the further game may be determined on the basis of symbol combinations, such as, for example, symbol combinations in lines and/or rows of symbols.

In this embodiment, an outcome of the game, as indicated by the segment 56 of the wheel which is selected as the game outcome, may influence operation of the further game. For example, the outcome represented by segment 56A of the wheel designates that one of the symbols (the "K" symbol in this example) is "wild" for 15 free games. The game controller is arranged to play 15 free symbol games in which the K symbol is designated wild (i.e. can be substituted for any symbol which may result in a desired game outcome, such as a "Win" outcome). This has the advantage that a prize may be awarded which does not depend only the odds provided by the wheel 55, but which also depends on odds that can be offered in the further symbol game.

Figure 10:
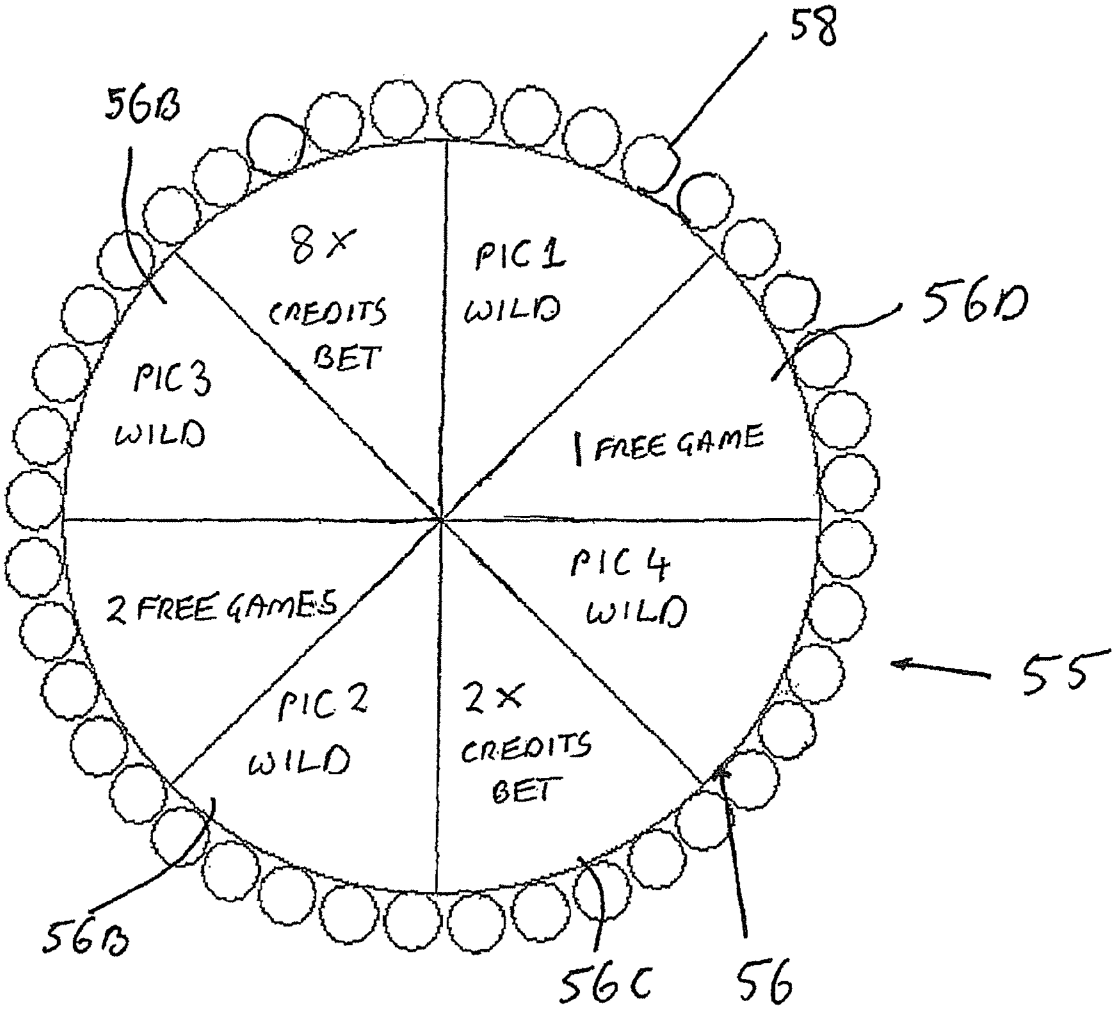
FIG. 10 shows a screen display associated with a wheel according to a further embodiment of the present invention.

Referring to FIG. 10, a further embodiment of the wheel feature indictor 55 in accordance with the present invention is shown. With reference to the previous drawings like reference numerals refer to like parts unless otherwise specified. In this embodiment, the segments of the wheel 55 are of equal size. As with the FIG. 6 embodiment, however, operation of the wheel 55 may affect operation of a further game, such as a reel game played as one or more of a series of free games. For example, segments 56B of the wheel 55 designate that one or more symbols of the further game are "wild". This has the advantage that a prize may be awarded which does not depend only on the odds provided by the wheel 55, but which also depends upon odds that can be offered in the symbol game. High prizes may therefore be awarded via this two stage process, being the wheel game followed by one or more plays of a reel game.

In the particular embodiment of FIG. 10, the wheel games and further reel games are generated as a feature of a primary game (such as another symbol game which may generate a trigger for the feature, as discussed above). In this embodiment, three free games are awarded when the feature is triggered. The wheel is "spun" prior to each free game. If the wheel stops on a symbol, that symbol is WILD for all the remaining free games. If the wheel stops on a "free game" segment 56C, further free games (depending upon the number designated) are added to the remaining free games. If the wheel stops on a credit prize, that prize is awarded as a bonus, and the other free games are then subsequently played. It will be appreciated that this allows for the awarding of many prizes, some of which may be relatively high prizes. Spinning the wheel 55 before each free game, means that the subsequent free game operation will be affected by the spin and, for example, different symbols may be designated wild. This would mean that, in this embodiment where the symbol is wild for all the remaining free games a plurality of symbols could become wild, increasing opportunities for prizes.

In this embodiment, the trigger feature awards three free games (three plays of the wheel feature followed by the reel feature). The invention is not limited to the feature game comprising three free games. There may be any number of free games.

Figure 11:
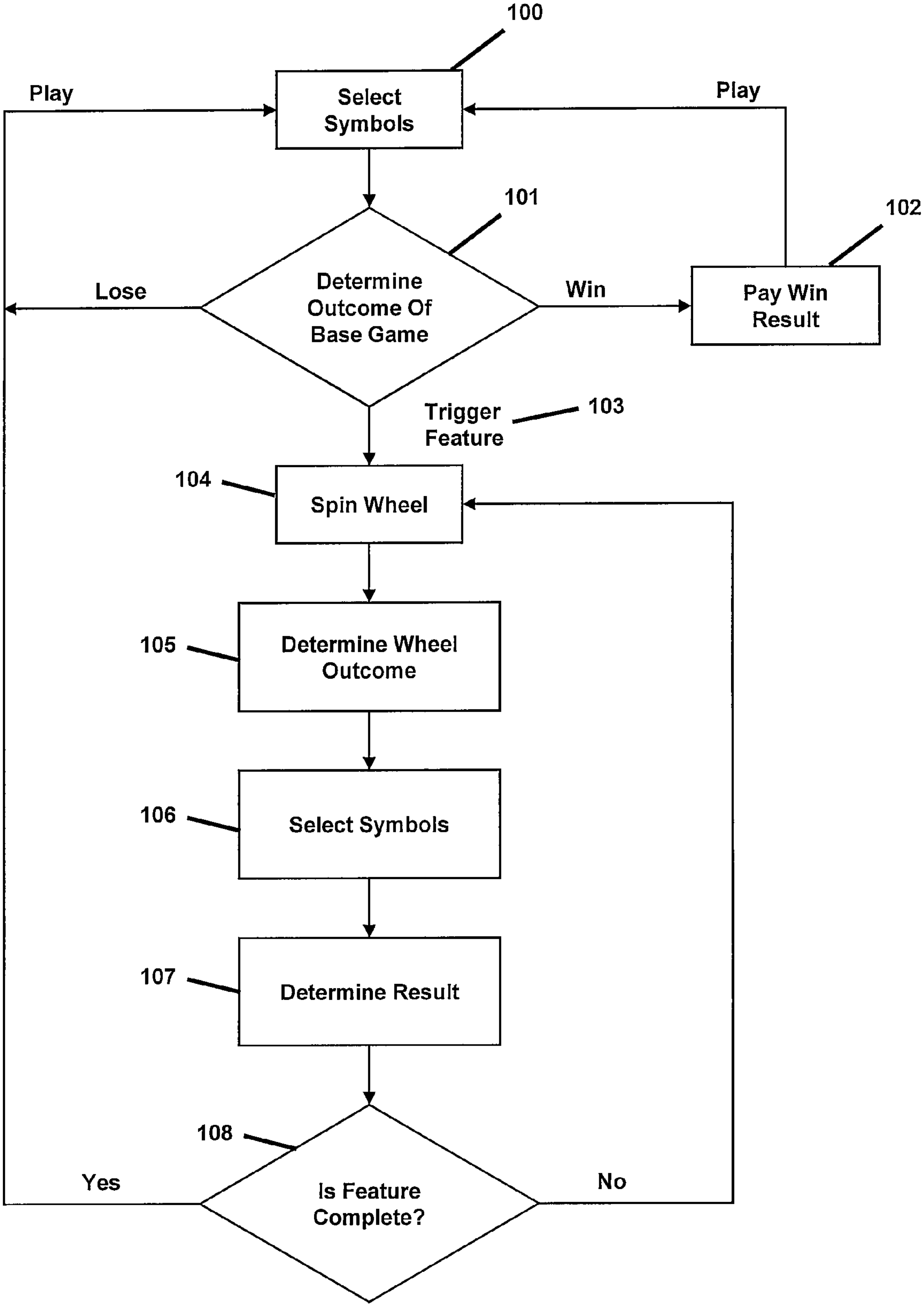
FIG. 11 is a flow diagram illustrating operation of a gaming system in accordance with an embodiment of the present invention.

A game playing process of this embodiment will now will be summarized with reference to FIG. 11.

At step 100, the primary ("base") game is played by selection of symbols from a plurality of available symbols. At step 101 the outcome of the base game is determined. Depending on the combination of symbols, this may be a "Win", in which case a Win Result (step 102) is determined for the player. The player may then have the choice to play again. The result may be a "Lose" result, in which case the player will again have the choice whether to play again. In some cases (such as in the example described above where a feature game is generated)

a feature may be triggered (step 103) to play the game (wheel game) and further game (in this embodiment further symbol selection).

At step 104 the wheel is spun. At step 105 a wheel outcome is determined. This may be any of the outcomes designated by the segments 56 of the wheel of FIG. 10. At step 106 the reel game is played and symbols are selected. A result is determined at step 107, which may be a win result, for example. Note that at step 106 symbols may be wild so the outcome of the game will depend on what has occurred at the wheel spin step 104 and wheel step outcome determination step 105.

At step 108 it is determined whether or not the feature is complete, which will generally depend upon how many further free games are available. If the feature is not complete ("NO") then the wheel is spun again at step 104. If the feature is complete ("YES"), then the player has the choice whether or not to play the primary game again.

In the embodiments of FIG. 6, 10, 11 the wheel game and further game are generated as a feature game of a primary game. The invention is not limited to this. The wheel game and further game may be a stand alone game which is not dependent on a primary game.

In the embodiment of FIGS. 6, 10 and 11, the further game is a symbol game, where a plurality of symbols are selected from a plurality of available symbols. The further game need not be a symbol game, but could be any other type of game.

As discussed above, a particularly advantageous feature of the FIG. 10 embodiment is that, if a segment of the wheel is selected that designates a symbol is "wild" in subsequent reel games, then that symbol remains wild for the remaining amount of free games available. Each time the wheel is spun, another symbol may be designated wild. The result can therefore be a number of wild symbols occurring in subsequent reel games. The invention is not limited to this, however. In alternative embodiments, a symbol may be designated wild for only a limited number of following reel games e.g. 1, 2 or more reel games. The embodiment shown in FIG. 6 illustrates another major advantage. If it was required to offer a 1000 credit prize on a wheel in which all segments were equally sized, it would be necessary to make all of the segments the same size as the segment carrying the 1000 credit prize. It would be impossible or at least difficult to effectively describe free games and other feature awards offered on the other segments because of their small size. In other words, there would not physically be enough room on the segments.

Of course, the segment for the major prize occupies only a small portion of the wheel in comparison to other segments. In order to draw attention to the major prize, the segment containing the prize may be made to be eye-catching, for example by having a bright red background when all other segments have a white or pale coloured background. Also, the major prize may be located top and centre and will remain there in embodiments of the present invention using a selector in the form of chaser lights or similar instead of rotating the wheel 56.

Figure 7:
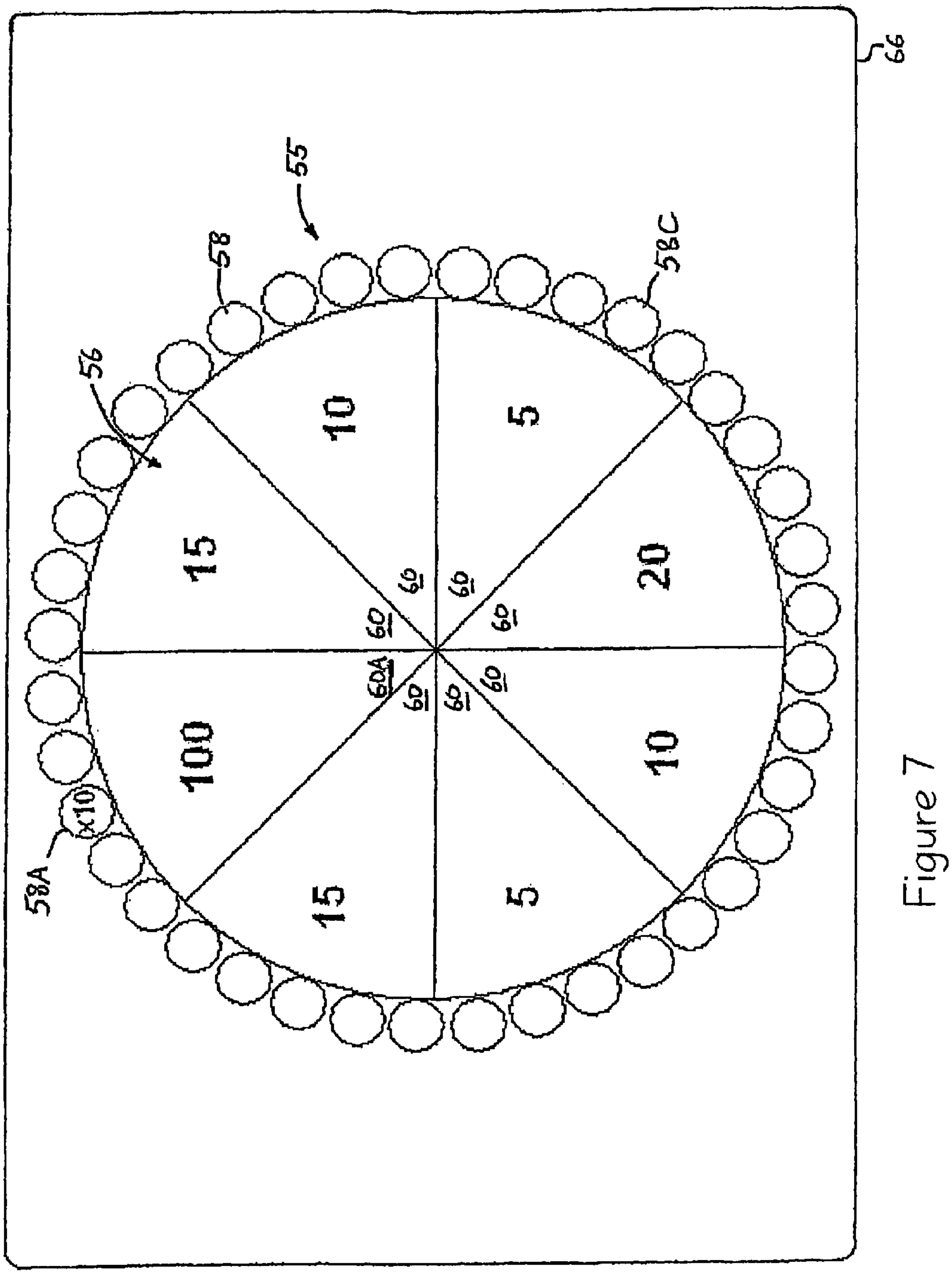
FIG. 7 shows a screen display associated with a further wheel feature.

In FIG. 7 of the drawings, a still further embodiment of a screen display 66 of a wheel feature indicator 55 is shown. With reference to the previous drawings, like reference numerals referring to like parts unless otherwise specified. In this embodiment of the invention, all the segments 60 are of the same size. However, one of the segments 60A has a prize outcome of a number of credits, which is larger than the prize outcomes carried by the other segments 60. In addition, one of the chaser lights 58A associated with the segment 60A carries a multiplier on it which multiplies the number of credits shown on the segment 60A. Therefore, within the segment 60A are two possible outcomes, one associated with four chaser lights (in two parts) and indicating a prize of 100 credits and another associated with one chaser light, indicating a prize of 1000 credits. The chances of winning the 1000 credits still, however, can reflect the probability that would be expected on a visual inspection of the wheel feature indicator 55.

Accordingly, in this embodiment of the invention, if the last chaser light 58 that remains illuminated is the chaser light 58A, then the prize awarded to the player is 100 credits, being the number of credits on the segment 60A multiplied by the multiplier carried on the chaser light 58A. Because only the one chaser light 58A associated with the segment 60A carried the multiplier, the probability of the top award prize being awarded is lower than the probability of any of the remaining prizes. An advantage on selecting the segment 60A with the largest outcome for the multiplier is that the value of the multiplier can be reduced. As the multiplier is displayed on a chaser light, the display area is limited. Referring still to FIG. 7, if a 1000 credit prize was to be awarded through the use of a multiplier on the chaser light 58C, then the multiplier would be 200, a three digit number that would need to be printed using smaller digits than a two digit number to fit on the chaser light.

Figure 8:
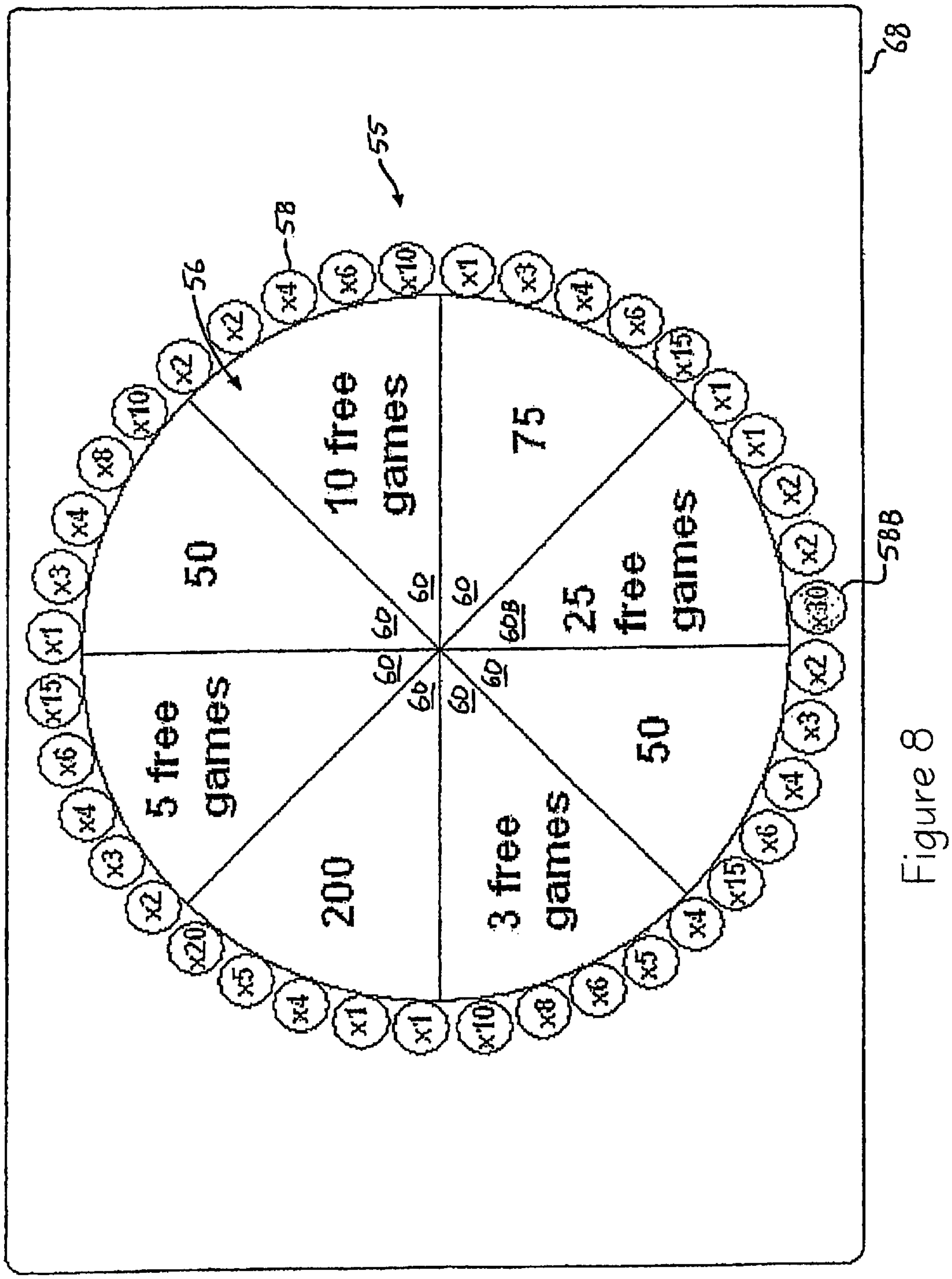
FIG. 8 shows a screen display associated with a further wheel feature.

In FIG. 8 of the drawings, a screen display 69 of yet a further embodiment of the wheel feature indicator 55 is shown. As in the case of the previous embodiments, like reference numerals refer to like parts unless otherwise specified. In this embodiment, like the embodiment shown in FIG. 7, all the segments 60 are of the same size. In the embodiment shown in FIG. 8, some of the segments of the segments 60 carry an outcome that is a prize in the form of a specified number of credits. If a chaser light of the chaser lights 58 that is opposite these segments is the last chaser light illuminated, the outcome is the number of credits indicated on the segment multiplied by a multiplier value that is carried by that particular chaser light. If the last chaser light that is illuminated of the chaser lights 58 is associated with a segment 60 carrying a number of free games (typically for the primary game), then the prize that is awarded is the number of free games on the marked segment 60. Any win occurring during the free games is then multiplied by the multiplier of the illuminated chaser light 58.

As in the previous embodiments, a particular chaser light, indicated by the combination of the segment 60B and chaser light 58B, provides an award that may be of substantially higher value (in this embodiment the value is variable within statistical bounds, due to the prize being dependent on play of a primary game) than any of the other outcomes. In the illustrated embodiment, the segment 60B carries an outcome of 25 free games and the chaser light 58B carries a multiplier of substantially higher value than any of the other multipliers. If the last chaser light 58 that is illuminated is chaser light 58B the player is awarded an outcome of 25 free games in which any win in the free game series is multiplied by a multiplier of 30. A major prize awarded in this way may provide particular excitement to a player that wins the large prize, as the awarding of the large prize is an ongoing exercise spanning 25 games. When this is used in combination with a wheel feature, which has proven appeal, the overall result may be particularly advantageous.

The feature wheel indicator 55 shown in FIG. 8 has a second major prize, namely 4000 credits awarded when the chaser light that indicated ×20, which is opposite the segments that indicated 200, is the last chaser light of the chaser lights 58 to be illuminated. Due to the relatively small area (2 parts in 40) that the major prizes occupy, it is possible with the present invention to offer more than one major prize on a feature wheel.

In an alternative to the embodiments shown in FIGS. 7 and 8, one or more of the chaser lights 58 may indicate a prize that is independent of the segment 60 that it is opposite, if it is opposite any segment 60 at all (the chaser lights 58 that indicate an independent prize may be located away from the segments 60). For example one chaser light 58 may have the symbol "$" on it and this may be the major prize. In this embodiment it is clear that the chaser lights 58 that indicate a prize that is independent of any segment 60 are outcome indicating parts, the difference being that the chaser light is selected when it is illuminated, in contrast to a segment 60 being selected when a marker 58 that is adjacent to the segment 60 is illuminated.

Figure 9:
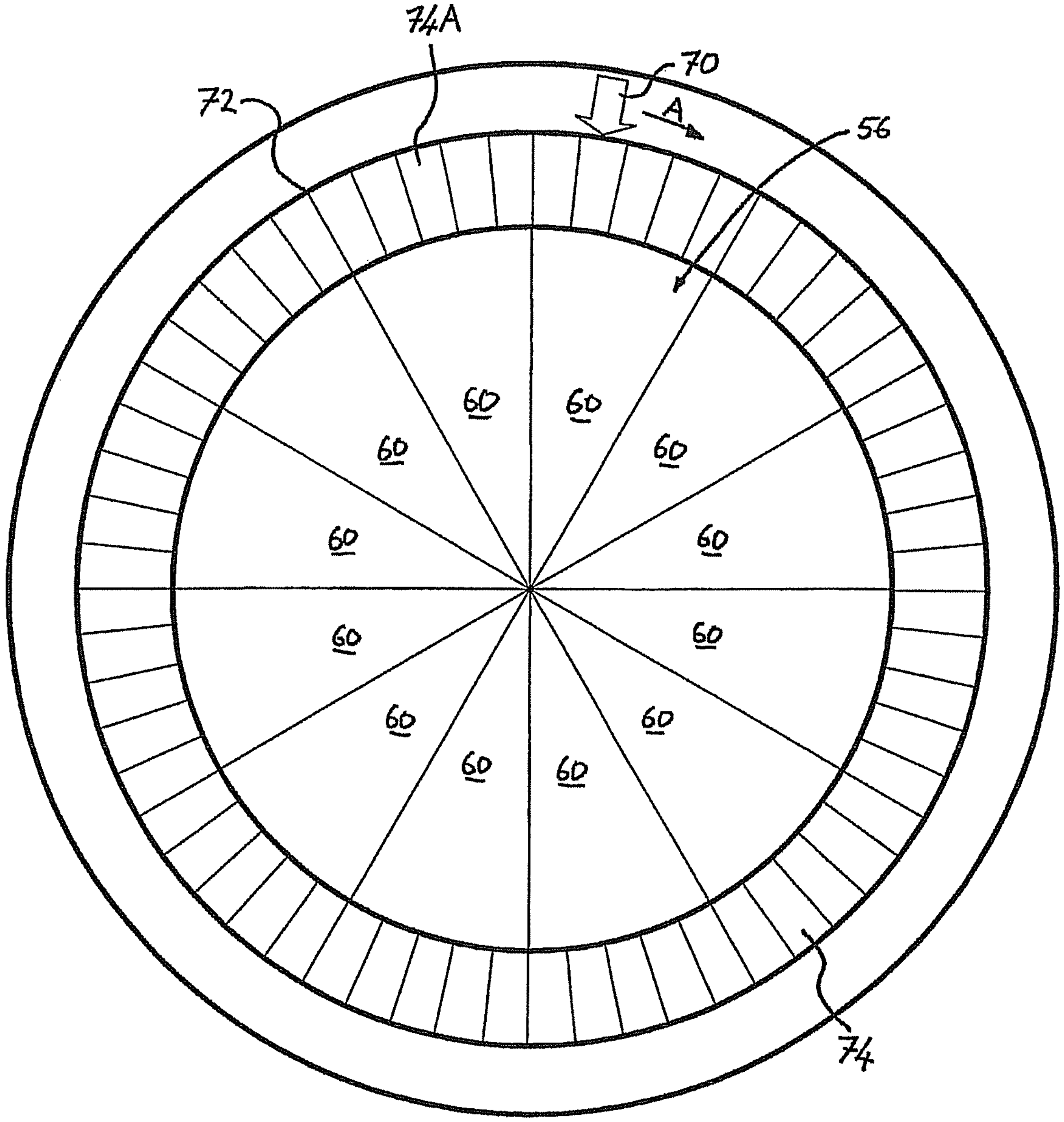
FIG. 9 shows a representation of a further wheel feature.

A further alternative embodiment is shown in FIG. 9. An arrow 70 or other marker travels continuously around the wheel 56 and an annulus 72 has been located around the wheel 56, the annulus 72 separated into parts 74 (only one of which is indicated in FIG. 9 by a reference numeral) marked in a similar or corresponding way to the chaser lights 58 shown in FIG. 8. This embodiment may be particularly suited to the use of colour coding to indicate prizes. The arrow 70 could then travel around the outer side of the annulus 72 as indicated by arrow A in FIG. 9, or between the annulus 72 and the wheel 56 to select the combination of one of the segments 60 and one part 74 of the annulus 72. Where the feature wheel is not circular, the annulus 72 would be replaced by a corresponding different shape. Although neither the segments 60 nor the parts 74 of the annulus 72 are shown in FIG. 9 with indicia (or colour coding), they will be marked so that a major prize can be won. For example, the part 74A may indicate a major prize in a similar way in which chaser light 58B (see FIG. 8) indicated a major prize. Of course, the segments 60 shown in FIG. 9 need not be all the same size. For example the wheel 56 may have a small segments 60 that only corresponds to the part 74A in a similar manner to segment 62 only corresponding to a single chaser light (see FIG. 5).

It will be appreciated, that, although the invention has been described with reference to the display of the wheel feature being implemented as an electronic simulation of a wheel, the display of the wheel feature could be implemented in an electro-mechanical form with a stationary wheel (where this is required) and actual chaser lights arrayed about the periphery of the wheel. Alternatively, the wheel feature could be implemented as an electro mechanical wheel with any form of marker, or the wheel may spin itself and the mark remain stationary.

In the above embodiments, the wheel feature is a traditional circular wheel, with the plurality of outcome indicating parts being segments of the wheel. In alternative embodiments, the wheel feature may be generally rectangular, triangular, or polygonal in overall shape. In an alternative embodiment, the feature may not be a wheel at all, and could be, for example, a series of adjacent segments with an indicator moving between the segments.

In the above embodiments, where the primary game or further game are wheel games, the wheels are shown displaying five rows and three columns. The invention is not limited to this arrangement. There may be any number of rows and columns for the primary wheel game and/for the further wheel game.

The primary game or further game may be emulated as reels or implemented as actual reels. In an alternative embodiment, the display may not emulate reels but merely show the selected symbols in a non-reel format e.g. presenting them as emulated playing cards, or other graphical representations. In this embodiment, each selection of a set of symbols is equivalent to one "spin" of the reels.

It will be appreciated by persons skilled in the art that numerous variations and/or modifications may be made to the invention as shown in the specific embodiments described herein without departing from the scope of the invention as defined in the appended claims. The present embodiments are, therefore, to be considered in all aspects as illustrative and not restrictive.

The invention claimed is:

1. A gaming apparatus comprising at least one display and a game controller arranged to:

control operation of a base game and a feature game;

control the at least one display to display representations of play of the base game, the representations comprising a plurality of symbols selected from a set of symbols, each of the plurality of symbols being displayed in a respective display position;

control the at least one display to display representations of play of the feature game, the representations comprising a selector having a plurality of outcome indicating parts and a marker;

determine a game outcome for the feature game and control the selector to indicate one of the outcome indicating parts to indicate the game outcome;

select, in accordance with the occurrence of the game outcome in the feature game, (1) at least one symbol from the set of symbols, and (2) a value that is indicative of at least one awarded subsequent plays of the base game;

assign an enhanced functionality to the at least one symbol, the enhanced functionality applying to each occurrence of the at least one symbol in each of the at least one awarded subsequent plays of the base game; and control operation of the at least one awarded subsequent plays of the base game in which a plurality of symbols is selected from the set of symbols, wherein an outcome of the at least one awarded subsequent plays of the base game is determined based on the selected symbols and the enhanced functionality in the at least one awarded subsequent plays of the base game.

2. A gaming apparatus in accordance with claim 1, wherein the game controller is arranged to provide for play of a subsequent feature game between plays of each of the at least one awarded subsequent plays of the base game.

3. A gaming apparatus in accordance with claim 2, wherein the game controller is arranged to select, in accordance with the occurrence of a further game outcome in the subsequent feature game, (1) the at least one additional symbol from the set of symbols, and (2) assign an enhanced functionality to the at least one additional symbol, the enhanced functionality applying to each occurrence of the additional symbol in the remaining plays of the at least one awarded subsequent plays of the base game an outcome of the base game determines a function of one or more of the symbols of the further game.

4. A gaming apparatus in accordance with claim 3, wherein an outcome of the feature game determines that one of more of the symbols in the at least one awarded subsequent plays of the base game will function as a "wild" symbol.

5. A gaming apparatus in accordance with claim 4, wherein a plurality of outcomes of the subsequent feature game designate that one or more symbols in the remaining plays of the at least one awarded subsequent plays of the base game are "wild".

6. A gaming apparatus in accordance with claim 3 wherein the game outcome of the feature game determines a function of one or more of the symbols for a plurality of the at least one awarded subsequent plays of the base games.

7. A gaming apparatus in accordance with claim 1, the at least one awarded subsequent plays of the base game and feature game being triggered by an outcome of the base game, the game controller being arranged to play a plurality of sequential operations of the at least one awarded subsequent plays of the base game and feature game as a result of the base game outcome.

8. A computer program, comprising instructions for controlling the game controller to implement a gaming apparatus in accordance with claim 1.

9. A non-transitory computer readable medium providing the computer program for controlling the game controller for implementing the game apparatus in accordance with claim 8.

10. A game controller and associated computer memory for a gaming machine, the game controller operable to:

- control play of a base game that is played on a gaming machine and to generate control signals for at least one display, wherein when the control signals are received by the at least one display, the at least one display displays representations of play of the base game, the representations comprising a plurality of symbols selected from a set of symbols, each of the plurality of symbols being displayed in a respective display position:
- control the at least one display to display representations of play of a feature game, the representations comprising a selector having a plurality of outcome indicating parts and a marker;
- determine an outcome for the feature game and control the selector to indicate the one of the outcome indicating parts associated with the game outcome;
- select, in accordance with the occurrence of the game outcome in the feature game, (1) at least one symbol from the set of symbols, and (2) a value that is indicative of at least one awarded subsequent plays of the base game;
- assign an enhanced functionality to the at least one symbol, the enhanced functionality applying to each occurrence of the at least one symbol in each of the at least one awarded subsequent plays of the base game; and
- control operation of the at least one awarded subsequent plays of the base game in which a plurality of symbols is selected from the set of symbols, wherein an outcome of the at least one awarded subsequent plays of the base game is determined based on the selected symbols and the enhanced functionality in the at least one awarded subsequent plays of the base game.

11. A game controller in accordance with claim 10, arranged to provide for play of a subsequent feature game between plays of each of the at least one awarded subsequent plays of the base game.

12. A game controller in accordance with claim 11, wherein the game controller is arranged to select, in accordance with the occurrence of a further game outcome in the subsequent feature game, (1) at least one additional symbol from the set of symbols, and (2) assign an enhanced functionality to the at least one additional symbol, the enhanced functionality applying to each occurrence of the at least one additional symbol in the remaining plays of the at least one awarded subsequent plays of the base game an outcome of the base game determines a function of one or more of the symbols of the feature game.

13. A game controller in accordance with claim 12, wherein an outcome of the feature game determines that one or more of the symbols in the at least one awarded subsequent plays of the base game will function as a "wild" symbol.

14. A game controller in accordance with claim 13, wherein a plurality of outcomes of the subsequent feature game designate that one or more symbols in the remaining plays of the at least one awarded subsequent plays of the base game are "wild".

15. A game controller in accordance with claim 12, wherein a game outcome of the feature game determines the function of one or more of the symbols for a plurality of subsequent feature games.

16. A game controller in accordance with claim 10, the at least one awarded subsequent plays of the base game and the feature game being triggered by an outcome of the base game, the game controller being arranged to play a plurality of sequential operations of the at least one awarded subsequent plays of the base game and the feature game as a result of the base game outcome.

17. A method of gaming, comprising the steps of playing a base game and a feature game comprising;

- displaying representations of play of the base game, the representations comprising a plurality of symbols selected from a set of symbols, each of the plurality of symbols being displayed in a respective display position;
- displaying representations of the feature game on a display, the representations comprising a selector having a plurality of outcome indicating parts and a marker,
- determining, with a controller, a game outcome for the feature game, wherein the game outcome causes at least one symbol used in the base game to be modified such that the at least one symbol has enhanced functionality for a predefined plurality, as defined by the game outcome, of at least one awarded subsequent plays of the base game, the enhanced functionality applying to each occurrence of the at least one symbol in the at least one awarded subsequent plays of the base game;
- controlling the selector to indicate one of the outcome indicating parts to indicate the game outcome; and
- operating subsequent awarded plays of the base game in which a plurality of symbols is selected from the set of symbols, wherein an outcome of the subsequent awarded plays of the base game are determined based on the selected symbols and the enhanced functionality of the at least one symbol.

18. A method in accordance with claim 17, further including the step of operating play of a subsequent feature game between plays of each of the at least one awarded subsequent plays of the base game.

19. A method in accordance with claim 18, wherein the step of operating play of a subsequent feature game includes selecting at least one additional symbol from the set of symbols, and assigning an enhanced functionality to the at least one additional symbol, the enhanced functionality applying to each occurrence of the at least one additional symbol in the remaining plays of the subsequent plays of the base game.

20. A method in accordance with claim 19, wherein an outcome of the feature game determines that one or more of the symbols in the at least one awarded subsequent plays of the base game functions as a "wild" symbol.

21. A method in accordance with claim 20, wherein a plurality of outcomes of the subsequent feature game determine that one or more symbols in the remaining plays of the at least one awarded subsequent plays of the base game function a "wild" symbols.

22. A method in accordance with claim 18, wherein a game outcome of the feature game determines the function of one or more of the symbols for a plurality of the at least one awarded subsequent plays of the base game.

23. A method in accordance with claim 17, comprising the steps of playing a base game, an outcome of the base triggering play of the feature game and the at least one awarded subsequent plays of the base game, and playing a plurality of sequential operations of the at least one awarded subsequent plays of the base game and the feature game as a result of the base game outcome.

* * * * *